United States Patent [19]

Matsumoto

[11] Patent Number: 5,689,993
[45] Date of Patent: Nov. 25, 1997

[54] DOUBLE FLANK MESHING TEST METHOD

[75] Inventor: Sigeru Matsumoto, Tokyo, Japan

[73] Assignee: Kokusai Keisokuki Kabushiki Kaisha, Tokyo, Japan

[21] Appl. No.: 426,812

[22] Filed: Apr. 21, 1995

[51] Int. Cl.$^6$ .................................................. G01M 13/02
[52] U.S. Cl. ............................................ 73/162; 33/501.19
[58] Field of Search ............................ 73/162; 33/501.7, 33/501.8, 501, 13, 501.12, 501.19, 501.16

[56] References Cited

U.S. PATENT DOCUMENTS

| | | | |
|---|---|---|---|
| 2,661,542 | 12/1953 | Bean | 33/501.19 |
| 3,064,809 | 11/1962 | Anthony et al. | 73/162 |
| 4,488,359 | 12/1984 | Misson | 33/501.8 |
| 4,550,508 | 11/1985 | Spaeth | 33/501.19 |
| 4,704,799 | 11/1987 | Kobetsky | 33/501.8 |
| 4,831,872 | 5/1989 | Huang et al. | 73/162 |
| 5,016,471 | 5/1991 | Och | 33/501.19 |

*Primary Examiner*—William A. Cuchlinski, Jr.
*Assistant Examiner*—Andrew Hirshfeld
*Attorney, Agent, or Firm*—Kane, Dalsimer, Sullivan, Kurucz, Levy, Eisele and Richard, LLP

[57] ABSTRACT

A method for conducting a double flank meshing test uses test and a master gear with numbers of teeth having no common factors with respect to each other, and a test gear is used to calibrate the master gear.

6 Claims, 7 Drawing Sheets

DOUBLE FLANK MESHING TEST METHOD

BACKGROUND OF THE INVENTION

The present invention relates to gear testing methods, and specifically to testing methods for determining run-out in tested gears.

The double flank meshing test (DFM test) is conventionally used to determine run-out for spur gears, helical gears, and other gears. In the DFM test, a master gear and a tested gear are intermeshed without backlash. The master gear is a highly accurately machined gear mounted on a precision spindle, and is used as reference for data collection. The master gear is movable away from the test gear, and as the gears are rotated, the displacement of the master gear is measured. The data record of deviation from the center-to-center distance of the master gear and test gear is used to determine the run-out of the test gear. At the same time, the over ball diameter (OBD) of the test gear, and the location and extent of surface nicks and scratches, may be determined from the same data.

However, since the dimensions and rotational accuracy of the master gear are used as reference to collect the test data, the master gear and corresponding spindle must be extremely accurate, and therefore expensive. Furthermore, the master gear must be carefully handled and regularly calibrated.

SUMMARY OF THE INVENTION

It is therefore an object of the present invention to provide an apparatus and method for a double flank meshing test which allows the use of a less accurate, less sensitive, and less expensive master gear, while still maintaining a sufficient level of accuracy in the DFM test.

In order to achieve the object, according to one aspect of the present invention, there is provided a method for double flank meshing testing, the method comprising the steps of: (a) mounting a master gear having unknown run-out and a reference test gear having unknown run-out to rotate intermeshed without backlash, the master gear being movable with reference to the reference test gear and biased to follow the reference test gear, and a number of teeth of the reference test gear having no common factors with a number of teeth of the master gear; (b) rotating the master gear so that the reference test gear rotates a number of times determined by the number of teeth of the master gear; (c) measuring displacements of the master gear with reference to the reference test gear, the measurement taken with reference to a predetermined tooth of the reference test gear and the measurement taken once per rotation of the test gear; (d) recording the measured displacements; (e) determining a compensation value for each tooth of the master gear based on the recorded displacements; (f) measuring a displacement of the master gear with reference to a test gear having unknown run-out so that the test gear rotates once and the measurement is taken with reference to every tooth of the test gear; and (g) determining a compensated displacement value for each tooth of the test gear by subtracting the determined compensation value corresponding to each tooth of the master gear from the measured displacements of the master gear, thereby to calculate a run-out value for the test gear based on the compensated displacement values. The reference test gear is not necessarily a special gear.

Optionally, the determining step (e) further comprises the steps of: (e1) matching the recorded displacements of the master gear with corresponding teeth of the master gear; (e2) averaging the recorded displacements of the master gear; (e3) subtracting the average from each of the recorded displacements, giving positive and negative deviations for each of the teeth of the master gear; and (e4) storing the deviations as compensation values.

Further optionally, the measuring step (f) comprises the steps of: (f1) mounting the master gear having the determined compensation values corresponding to each tooth of the master gear and a test gear having unknown run-out to rotate intermeshed without backlash, the master gear being movable with reference to the first test gear and biased to follow the first test gear; (f2) rotating the master gear so that the test gear rotates at least once; (f3) measuring displacements of the master gear with reference to the test gear, the measuring performed with reference to the teeth of the master gear and the measurement performed once per tooth of the test gear; and (f4) recording the measured displacements.

According to another aspect of the present invention, there is provided a method for double flank meshing testing, the method comprising the steps of: (a) meshing a reference test gear and a master gear without backlash, wherein a number of teeth of the reference test gear has no common factors with a number of teeth of the master gear; (b) rotating the reference test gear and the master gear intermeshed without backlash; (c) measuring displacements of the master gear relative to the reference test gear, the measurement taken when a predetermined tooth of the reference test gear engages each tooth of the master gear; (d) determining a compensation value of each tooth of the master gear based on the measured displacements, the compensation value being free from deviation of the reference test gear; (e) meshing a test gear and the master gear having the compensation value without backlash; (f) rotating the test gear and the master gear intermeshed without backlash so that the test gear rotates at least once; (g) measuring displacements of the master gear relative to the test gear with reference to every tooth of the test gear; and (h) compensating the measured displacements in accordance with the compensation values for each tooth of the master gear.

According to still another aspect of the present invention, there is provided a double flank meshing testing apparatus, the apparatus comprising: a reference shaft, mounted to a base, the shaft capable of rotatably supporting a test gear; a movable spindle, movable with reference to the reference shaft, the movable spindle biased towards the reference shaft; a motor, for rotating the spindle; a displacement detector, for detecting displacements of a gear provided to the spindle from the test gear provided to the shaft; a tooth detector, for detecting passing gear teeth of a gear provided to the spindle and rotating with the spindle; and a control means, including a memory, the control means monitoring the tooth detector and the displacement detector, wherein a master gear having unknown run-out and a test gear having unknown run-out are provided to the spindle and the shaft, respectively. The master gear and the test gear are engaged without backlash, and a number of teeth of the master gear and a number of teeth of the test gear share no common factors. The spindle is rotated such that the test gear rotates a number of times corresponding to the number of teeth of the master gear, and measured displacements of the spindle and the master gear, with reference to a predetermined tooth of the test gear and corresponding to each tooth of the master gear, are recorded by the CPU in the memory. The recorded displacements are averaged, and the average is subtracted from the recorded displacements to determine a compensation value for the each tooth of the master gear, and the compensation values are recorded.

Optionally, the master gear having a recorded compensation value for each tooth, and a test gear having unknown run-out are provided to the spindle and the shaft, respectively, and the master gear and the test gear are engaged without backlash. The spindle is rotated such that the test gear rotates at least once, and displacements of the spindle and the master gear, corresponding to sequentially meshed set of teeth of the master gear and the test gear, are measured. The measured displacements are compensated by the recorded compensation value for each tooth of the master gear, and the compensated measured displacements are used to determine a run-out value for the test gear. Further, the compensated measured displacements are used to determine an over ball diameter value for the test gear. Further, the compensated measured displacements are used to determine a largest surface defect measurement value for the test gear.

DESCRIPTION OF THE ACCOMPANYING DRAWINGS

DESCRIPTION OF THE EMBODIMENTS

With reference to the drawings, an embodiment of the present invention is described.

Figure 1:
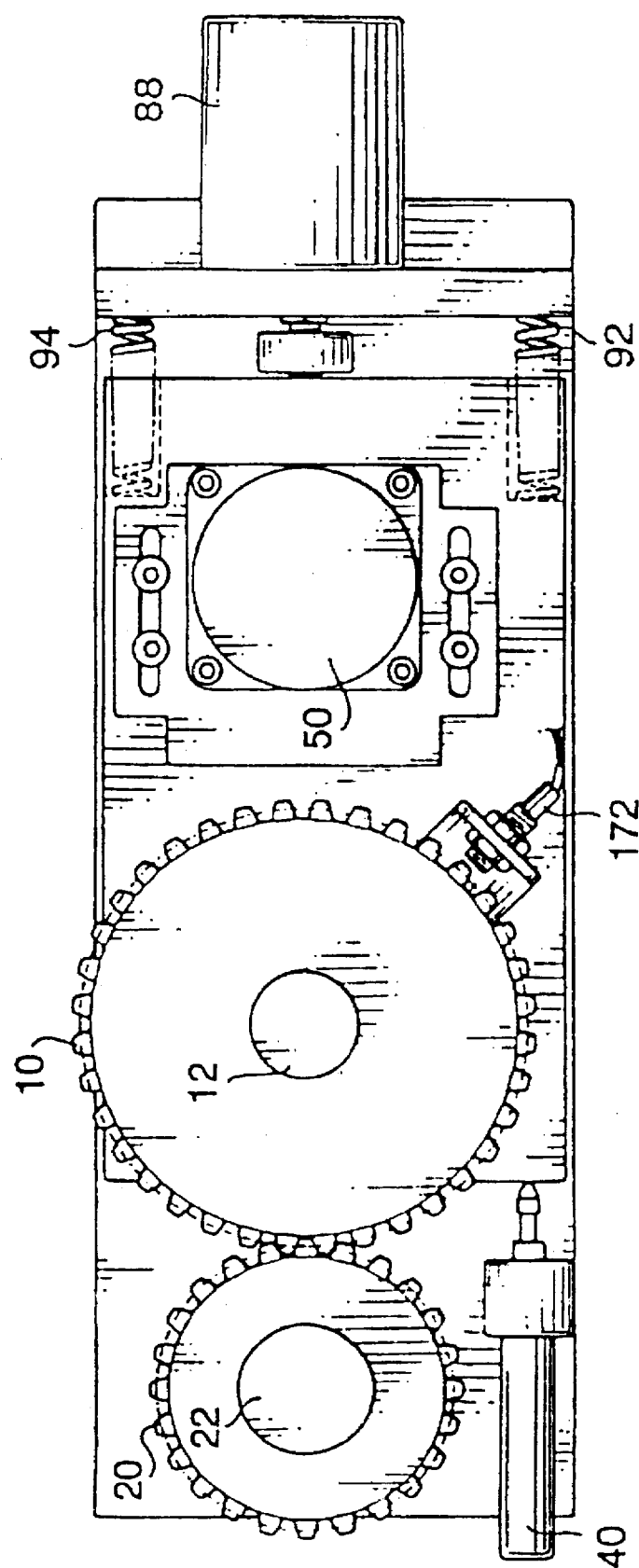
FIG. 1 is a schematic view of a double flank meshing test apparatus to which the present invention is applied.

FIG. 1 illustrates a double flank meshing (DFM) test apparatus 9 to which the present invention is applied. A test gear 20 is rotatable supported by a fixed shaft 22, and fit to the fixed shaft 22 with a close slip fit. A master gear 10 is mounted on a spindle 12, which is driven by a motor 50. The master gear 10 and spindle 12 are supported to be linearly movable in one direction away from the center of the test gear 20, and are biased by parallel springs 92 and 94 towards the center of the test gear 20. The springs 92 and 94 remove backlash in the system.

When the master gear 10 is rotated by the motor 50, the master gear 10 moves minutely toward and away from the test gear 20, following the added run-outs of the test gear 20, the master gear 10, and the spindle 12. The movement of the master gear 10 is recorded by a sensitive air capacitance displacement sensor 40, which senses the displacement of the spindle hub.

Figure 2:
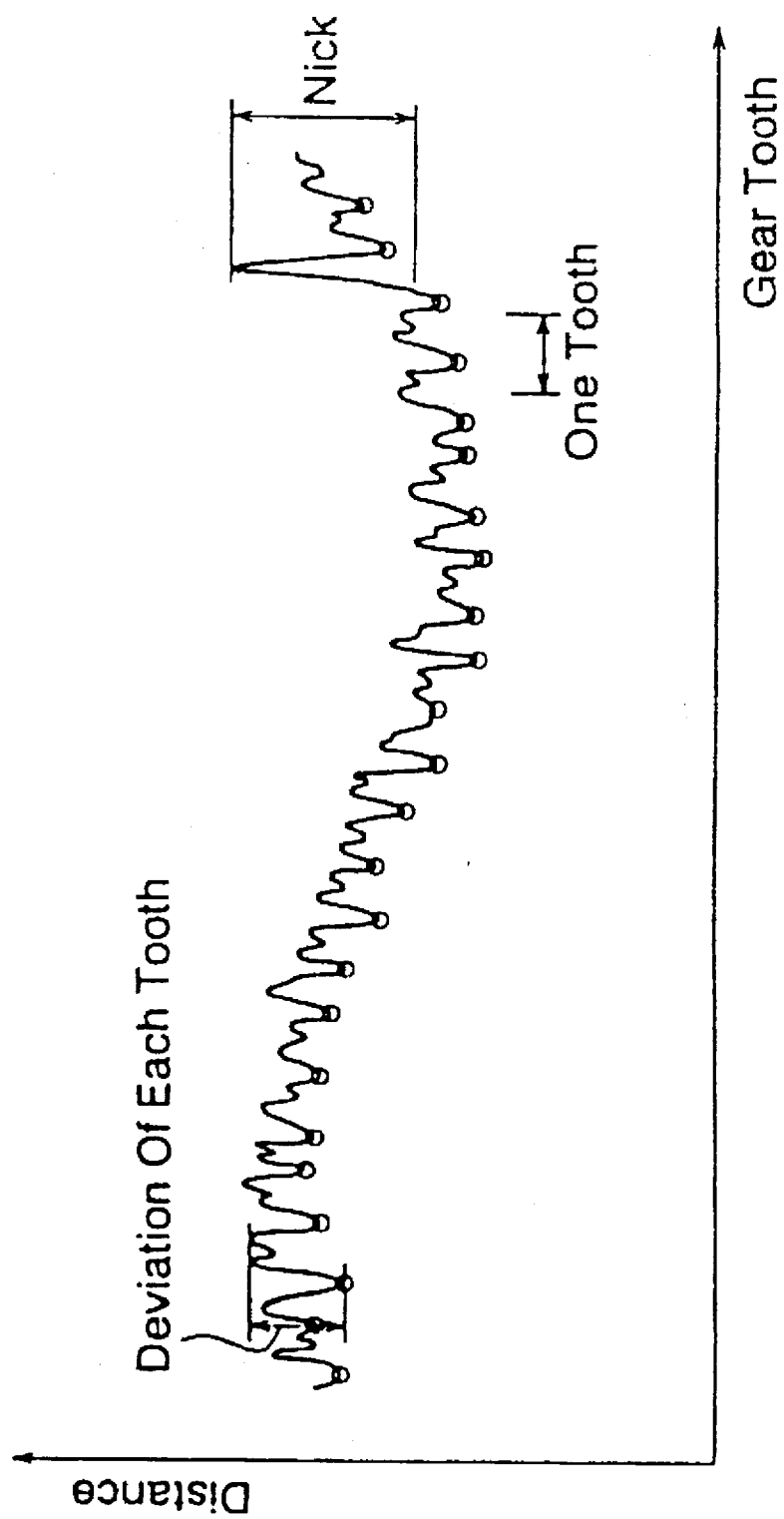
FIG. 2 is an example plot of data collected by a double flank testing machine.

FIG. 2 shows an example plot of a measured displacement of the master gear 10 from the reference center-to-center distance, the measurement taken as the gears 10 and 20 are rotated. In FIG. 2, the jagged, high frequency displacements represent the dimensional error of successive meshing teeth of the master and test gears 10 and 20. The low frequency, sine-like curve represents the combined run-outs of the master and test gears 10 and 20. The run-out of the spindle 12 is considered to be combined with the run-out of the master gear 10. The noise-like anomalous pulse represents a defect, such as a nick or scratch, in the surface of one of the gears 10, 20 (assumed to be the test gear 20), and the height of the pulse represents the severity of the defect.

Figure 3:
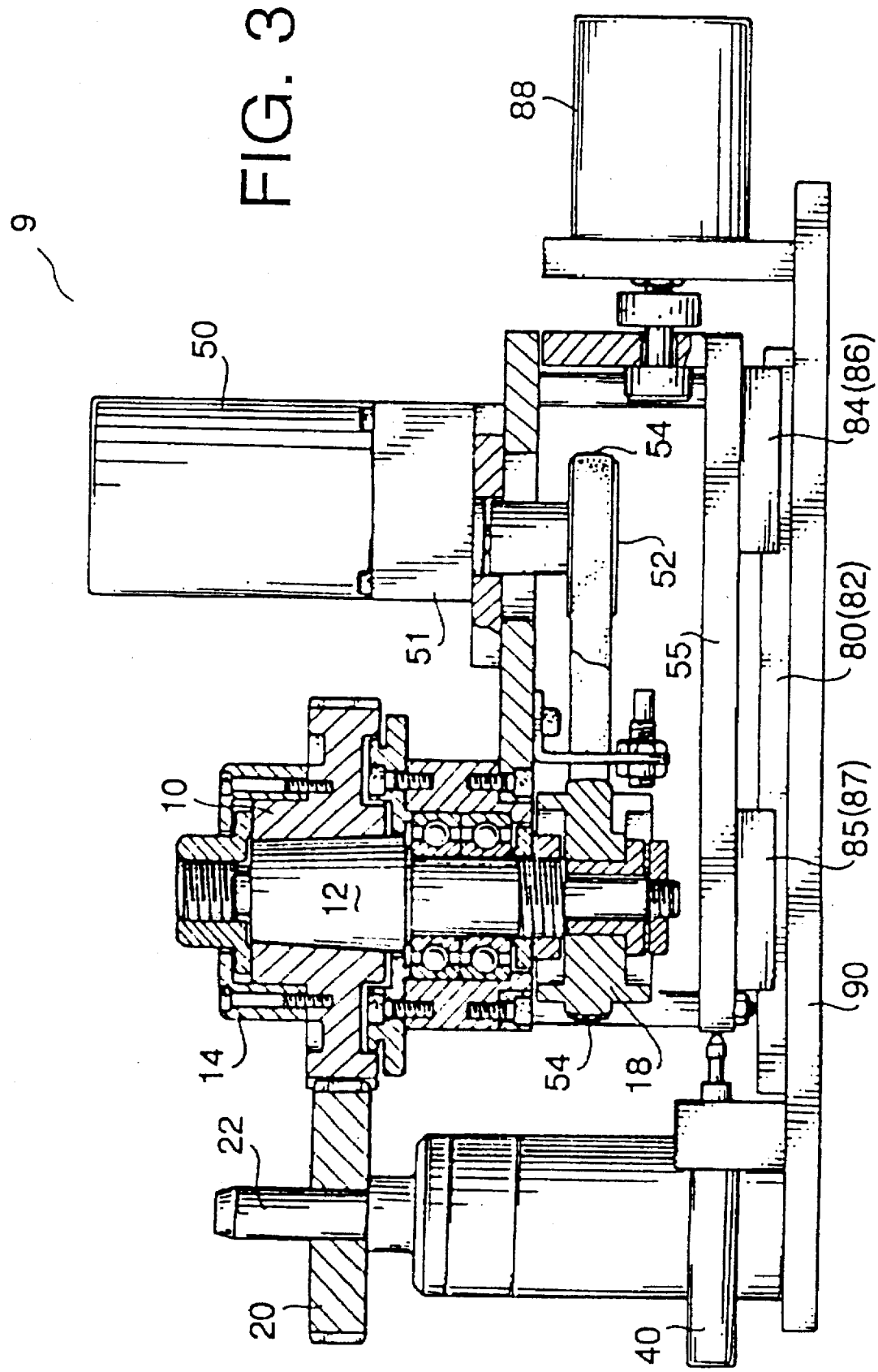
FIG. 3 is a side schematic view of a double flank meshing test apparatus to which the present invention is applied.

FIG. 3 shows the structure of a DFM test apparatus 9 to which an embodiment of the present invention is applied. In the described embodiment, the lowest recorded value of the displacement of each successive pair of meshing teeth is used to determine the combined run-out (as shown by small circles in FIG. 2).

As shown in FIG. 3, a master gear 10, having a tapered inner bore, is mounted to the spindle 12. The spindle 12 is mounted in turn to a movable support 55. The spindle 12 has a tapered shaft, matching the taper of the master gear 10 bore.. The master gear 10 is tightened to the spindle 12 by a flange coupling 14, which holds the master gear 10 to the spindle 12 in a no-slip condition, but is not tightened with enough force to distort the master gear 10.

The movable support 55 further supports a motor 50, which drives a drive pulley 52 through a reduction gear box 51. The drive pulley 52 drives a spindle pulley 18 via a belt 54, the spindle pulley 18 being attached to the lower end of the spindle 12. The movable support 55 is supported on bearings 84, 85, 86, and 87 by parallel guides 80 and 82; the guides 80 and 82 are fixed to a base 90. In FIG. 3, a bracketed reference number denotes a corresponding opposite side part to the unbracketed visible side part.

A support shaft 22 is mounted on the base 90, for supporting the test gear 20. The portion of the shaft 22 that supports the test gear 20 is machined to allow the test gear 20 to rotate in a close slip fit. The test gear 20 is supported on an accurately machined shoulder of the shaft 22, the shoulder being arranged so that the axial centers of the test gear 20 and master gear 10 are coplanar.

The movable support 55 is biased toward the support shaft 22 and test gear 20 by springs 92 and 94 (as shown in FIG. 1), which are adjusted to have substantially equal biasing force. An air cylinder 88 is provided to retract the housing 55 away from the support shaft 22 so that the gears 10, 20 may be removed. With this arrangement, the test gear 20 and master gear 10 are intermeshed without backlash, and the master gear 10 is movable with reference to the test gear 20.

The displacement of the housing is measured by the displacement sensor 40, thereby measuring the displacement of the master gear 10. A tooth sensor 172 is provided in the vicinity of the master gear 10 (as shown in FIG. 1) for detecting the passing teeth of the master gear 10.

Figure 8:
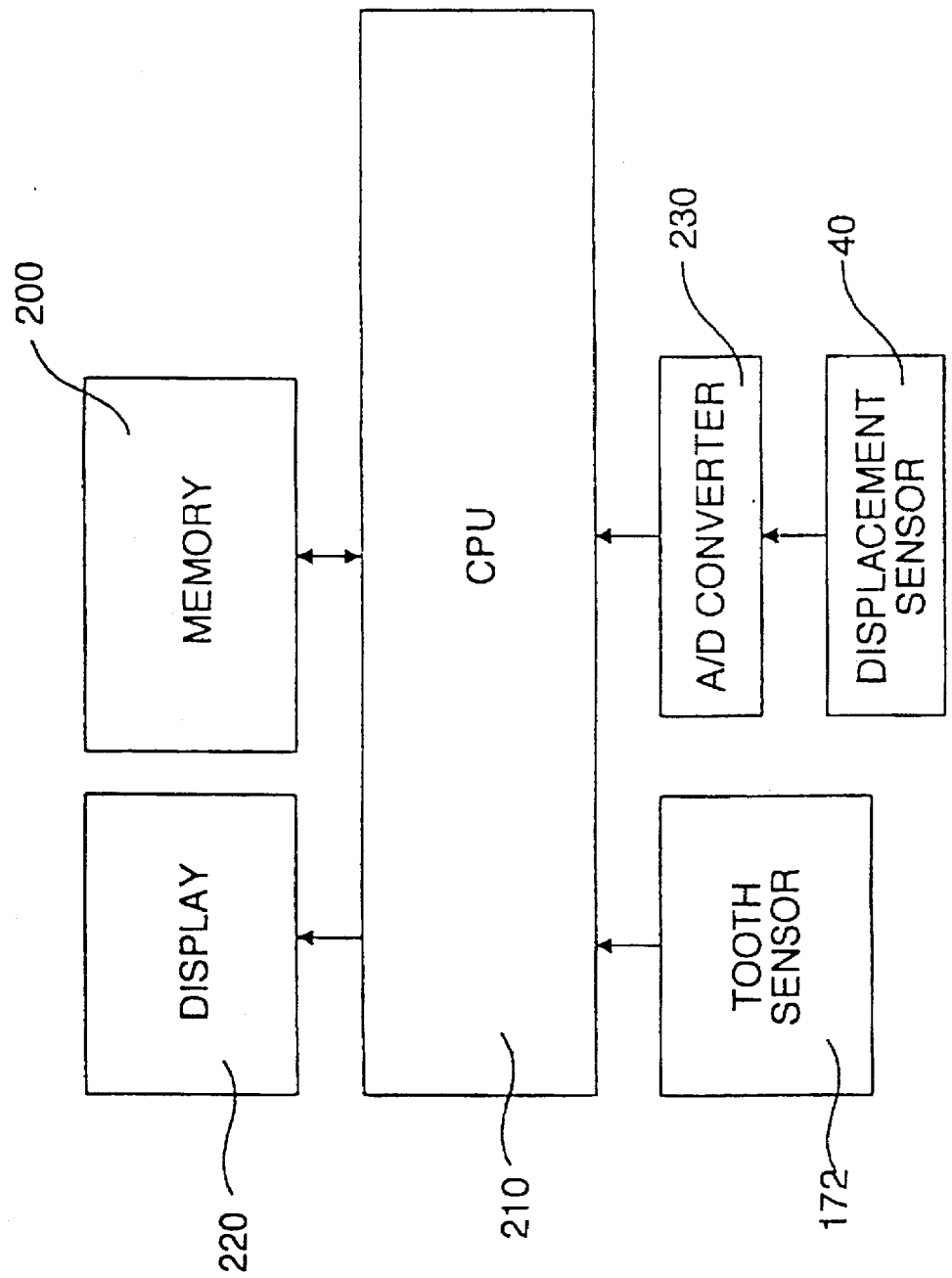
FIG. 8 is a block diagram showing a CPU and associated elements of the a double flank meshing test device.

The tooth sensor 172 is monitored by a CPU 210 as shown in FIG. 8. The displacement sensor 40 is also monitored by the CPU 210 via an A/D converter 230. The CPU 210 is connected to a memory 200 for recording pertinent data and values, and a display 220 for outputting the calculated results.

The embodiment of the invention uses a calibration or compensation method to allow the use of a less accurate (and hence, less expensive) master gear 10. The compensation method is based on the use of a master gear 10 having a number of teeth $Z_m$ having no common factors with the number of teeth $Z_w$ of the test gear 20; the lack of common factors ensures that a compensation value for each tooth of the master gear 10 can be easily determined. If the master gear 10 as described is rotated, enmeshed with the test gear 20, so that the test gear 20 rotates $Z_m$ times, an arbitrarily predetermined tooth of the test gear 20 engages each tooth of the master gear 10 once and only once, in an easily derivable order. If the chosen tooth of the test gear 20 is designated tooth TT at the first rotation of the test gear 20, and the tooth number of the master gear 10 that contacts the tooth TT at the end of rotation n (of the test gear 20) is identified by $MT_n$, then as the gears are rotated, for every rotation of the test gear 20, then:

$$MT_n = (((n-1) \times Z_w) \text{ MOD } Z_m) + 1 \quad n=1 \ldots Z_m, \quad (1)$$

where n is the rotation count, $MT_1 = 1$, designating the first tooth of the master gear that is enmeshed with TT, and MOD is a conventional modulo operator.

That is, initially, n=1 and $MT_1=1$ (first meshed tooth of the master gear); n=2 at the end of the first rotation of the test gear 20, and the value of $MT_2$ depends on the number of teeth on each gear 10 and 20. For example, if the number of teeth $Z_m$ on the master gear 10 is 41, and the number of teeth $Z_w$ on the test gear 20 is 36 (as in the example of FIG. 4), then $MT_2 = (((2-1) \times 36) \text{ MOD } 41) + 1 = 37$, and the 37th tooth, counting from the arbitrary tooth 1, engages the tooth TT at the end the first rotation of the test gear 20. $MT_2$, $MT_3$, etc., are similarly derived. If $Z_m$ and $Z_w$ have no common factors, this relationship results in (a) no repetitions of any one tooth of the master gear 10 engaging the designated tooth TT of the test gear 20 in $Z_m$ rotations of the test gear 20, and (b) each tooth of the master gear 10 engaging the designated tooth TT of the test gear 20 in $Z_m$ rotations of the test gear 20. Thus, the master gear 10 is cut with $Z_m$ teeth, and the test gear 20 is cut with $Z_w$ teeth, $Z_m$ and $Z_w$ having no common factors to ensure that each tooth of the master gear 10 engages the reference tooth TT of the test gear 20 only once in $Z_m$ rotations.

Figure 4:
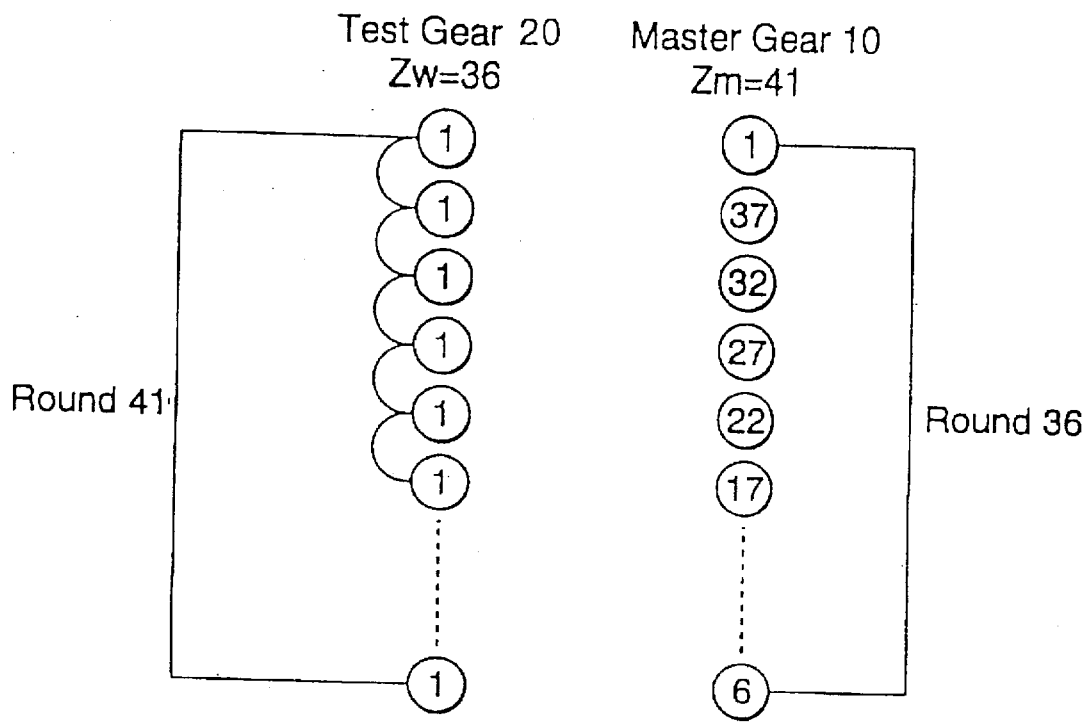
FIG. 4 is a chart showing a relationship between a master gear and a reference test gear during a compensation data collection procedure.
Figure 6:
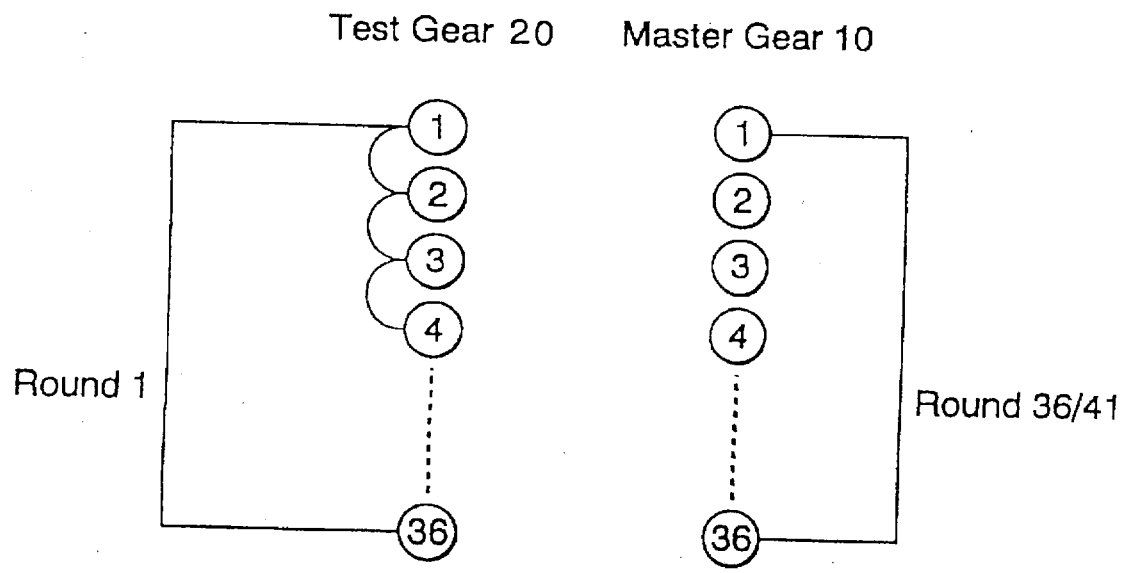
FIG. 6 is a chart showing a relationship between a master gear and a test gear during a run-out measuring procedure.

In an example, shown in FIG. 4, the test gears 20 have 36 teeth ($Z_w = 36$). 36 is resolved into prime factors as $2 \times 2 \times 3 \times 3$, or $2^2 \times 3^2$. Therefore, any number of teeth $Z_m$ (on the master gear 10) not having 2 or 3 as prime factors may be used. For example, $Z_m = 35$, 35 being resolved into prime factors as $5 \times 7$, may be used. In the example shown in FIG. 4, 41, being a prime number, is used. At the end of the first rotation, tooth 37 of the master gear engages tooth TT of the test gear, and at the end of the $40^{th}$ rotation tooth 6 of the master gear engages the test gear 20, with the intervening engagements partially shown. On the $41^{st}$ rotation, tooth TT of the test gear 20 and tooth 1 of the master gear again engage. Thus, the test gear 20 may be rotated any integer multiple of $Z_m$ times, giving averagable individual measurements for each tooth of the master gear.

Figure 9:
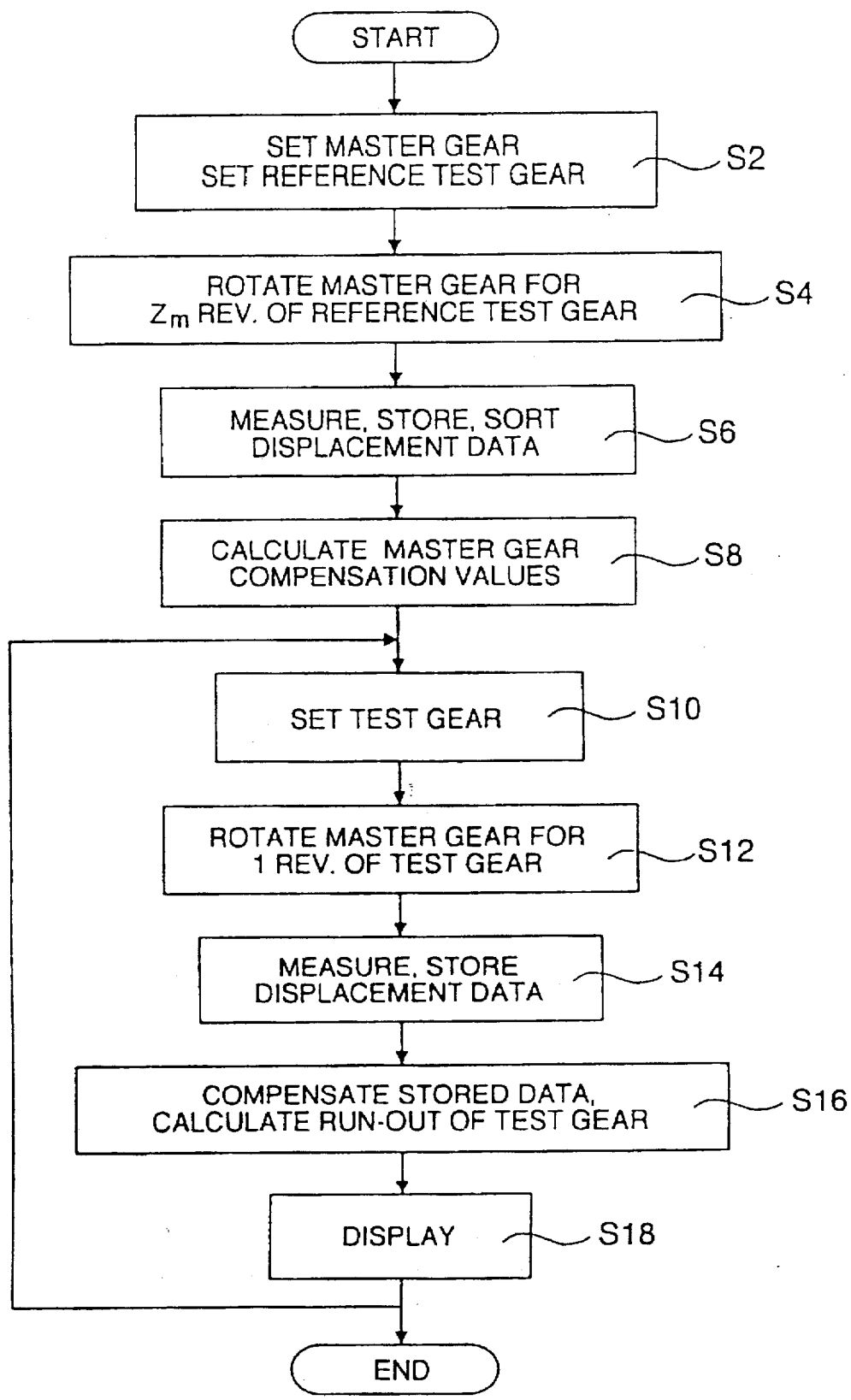
FIG. 9 is a flow chart showing steps of the compensation and run-out measuring procedures.

The steps of the process for determining the compensation values and to measure test gears 20 are shown in a flow chart in FIG. 9. To determine the appropriate compensation value for each tooth of the master gear 10, a reference test gear 20 from a group of test gears 20 to be tested is selected (any of the test gears 20 will satisfy the method) and mounted on the support shaft 22, with the arbitrarily designated tooth TT of the reference test gear 20 meshed with an arbitrarily designated first tooth ($MT_1 = 1$, the first tooth) of the master gear 10 (step S2). The reference test gear 20 and master gear 10 are meshed without backlash, and the master gear 10, enmeshed with the test gear 20, is rotated by the motor 50 such that the test gear rotates at least $Z_m$ times (step S4).

Data from the displacement sensor 40 is converted by the A/D converter 230, and monitored by the CPU 210. The displacement of the movable support 55 (and thereby the master gear 10), synchronized with the tooth count by the tooth sensor 172, is measured for one tooth span by the displacement sensor 40 every time the designated tooth TT of the reference test gear 20 is meshed with the master gear. The displacement data is only recorded in the memory 200 when the designated tooth TT is meshed with the master gear 10, meshed master gear 10 tooth number $MT_n$ being known from the previously described relationship, as shown by example in FIG. 4. A least value of the tooth span measurement of the combined displacement of each set of meshed teeth TT and $MT_n$, is recorded in the memory 200 and matched with the corresponding master gear 10 tooth number $MT_n$. The recorded least values are then sorted by the CPU 210 in tooth order 1 through $Z_m$ (step S6).

Figure 5:
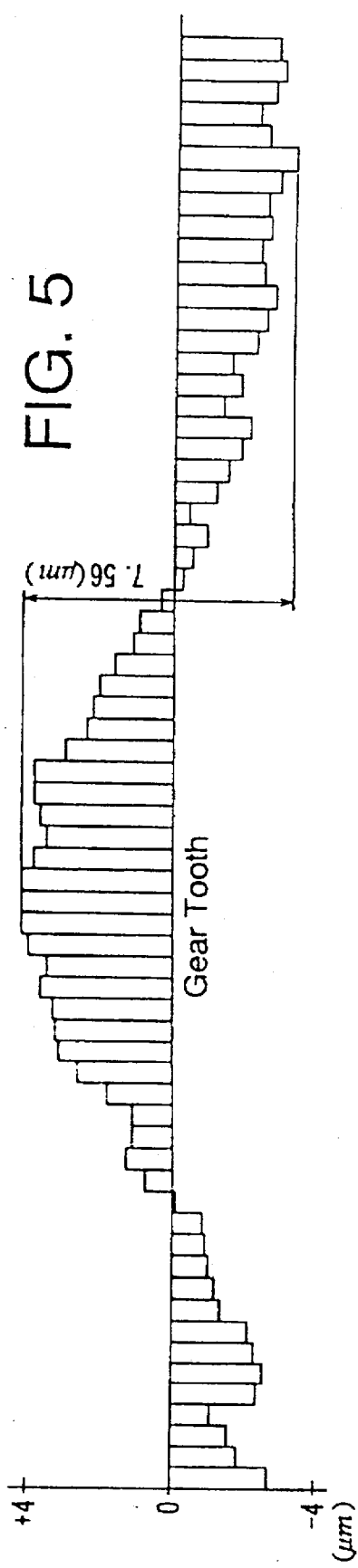
FIG. 5 is an example plot of data collected during the compensation data collection procedure.

With reference to FIG. 5, the recorded least values are then zeroed with reference to the average value of the recorded displacement value; that is, the average value is given the value of zero, and displacement values larger than the average are positive by their difference from the average, and displacement values smaller than the average are negative by their difference from the average. In this manner, the compensation values are obtained, for example, as $-1$ μm for the previously designated first tooth of the master gear 10, $+2$ μm for the second tooth, $-2$ μm for the third tooth, and so on. The compensation values are recorded in the memory 200 (step S8).

Figure 7:
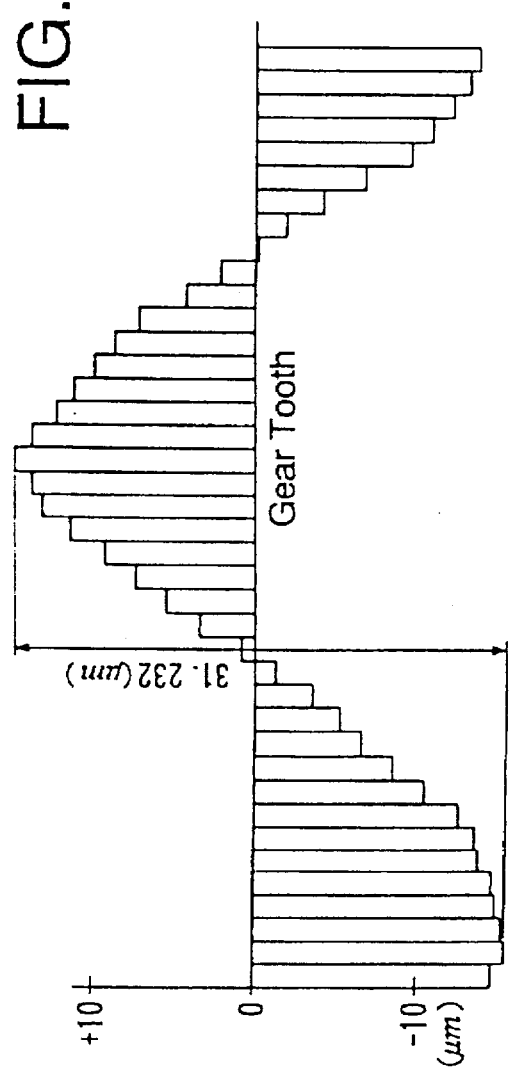
FIG. 7 is an example plot of data collected during the run-out measuring procedure.

To test a gear of the group of gears to be tested, the CPU uses the compensation values obtained to calibrate the master gear 10. A test gear 20 from a group of gears to be tested is selected and mounted on the support shaft 22, with the previously designated first tooth of the master gear 10 meshed with the test gear 20 (step S10). The tested gear 20 and master gear 10 are meshed without backlash, and the master gear 10 is rotated by the motor 50 such that the tested gear 20 is rotated only once (step S12). Data from the displacement sensor 40 is converted by the A/D converter 230, and recorded by the CPU 210 in the memory 200. The displacement of the movable support 55 (and thereby the master gear 10), synchronized with the tooth count by the tooth sensor 172, is measured continuously by the displacement sensor 40. A least displacement value of the tooth span measurement of the combined displacement of each set of meshed teeth is recorded in the memory 200 (step S14). The recorded deviation lowest value data appears as shown in FIG. 7. The compensation value for each tooth of the master gear 10 is known from the previously determined and recorded data, and the deviation data for each tooth of the tested gear 20 (as it engages a known tooth of the master gear 10) is compensated by the compensation values for the corresponding master gear 10 tooth. The run-out of the test gear 20 is then determined from the compensated data, using any conventional standard measure, for example peak-to-peak run-out (step S16). A display of the compensated run-out values is output at this point (step S18), but the embodiment preferably continues to derive further measurements from the collected data.

In order to measure the severity of defects (nicks, scratches, etc.) in the tested gear 20, a maximum peak value is determined (not shown in FIG. 7). The maximum peak value is determined by recording each peak displacement value of a tooth span data set, and subtracting the average of the recorded least displacement values on either side, giving a peak value for each tooth span. The maximum peak value is the maximum from among the peak values thus measured and recorded. The maximum peak value is compared by storing all peak values thus measured, and then comparing among them. Alternatively, a pair of maximum peak value registers are kept, with each successive recorded peak stored in a storage register and compared to a maximum register, replacing the value in the maximum register if greater.

The apparatus can also be used to measure over ball diameter (OBD), which is conventionally measured on a special OBD machine. In this case, an OBD compensation gear (not shown), measured on the OBD machine, is used. The OBD of a tested gear 20 is obtained by comparing the center-to-center distances (from the center of the master gear 10) of the OBD compensation gear and the test gear 20.

An average $A_w$ of the least displacement values of all of the teeth $TT_n$ of the test gear 20, and an average $A_b$ of the least displacement values of all of the teeth of the OBD compensation gear 200 are taken. The difference S between $A_w$ and $A_b$ represents the difference in radii between the gears 20 and 100. Using the previously measured OBD value $D^b$ of the OBD compensation gear 100, the OBD value $D_w$ of the test gear 20 can be determined in accordance with the following relationship:

$$D_w = D_b + 2 \times S \quad (2)$$
$$= D_b + 2 \times (A_b - A_w)$$

To determine the OBD value $A_b$, after the master gear 10 is calibrated (compensation values determined) using the reference test gear 20', the OBD compensation gear 100 is measured, and the least displacement values are recorded in the memory 200 and $A_b$ calculated by the CPU 210. The value for $D_b$ is entered into the memory 200 by an input means(not shown). All subsequent test gears 20 may then be measured for OBD, the calculation performed by the CPU 210.

Alternatively, the OBD compensation gear 100, which is of the same nominal size as the test gears 20, is used as a reference gear for the collection of master gear compensation data. In this case, the master gear, enmeshed with the OBD compensation gear 100, is rotated such that the OBD compensation gear rotates $Z_m$ times to obtain the compensation values, and immediately subsequently rotated to obtain the $A_b$ value for future OBD testing of all subsequent test gears 20. The value for $D^b$ is entered into the memory 200 by an input means(not shown). In this case, the calibration of the master gear 10 and the OBD value recording is done in one sitting, and all subsequent test gears 20 may then be measured for OBD, the calculation performed by the CPU 210.

The CPU 210 may then output all of the calculated values for run-out, peak defect, and OBD values for tested gears 20 to the display 220. A hardcopy device may also be attached (not shown).

Thus, the described embodiment removes the need for an expensive, highly accurate master gear in a double flank meshing run-out test by introducing a method of using any test gear 20 to self-calibrate the master gear 10. Furthermore, the method allows the measurement of OBD values directly on the DFM test machine.

What is claimed is:

1. A method for double flank meshing testing, said method comprising the steps of:
   (a) mounting a master gear having unknown run-out and a reference test gear having unknown run-out to rotate intermeshed without backlash, said master gear being movable with reference to said reference test gear and biased to follow said reference test gear, and a total number of teeth of said reference test gear having no common factors with a total number of teeth of said master gear;
   (b) rotating said master gear so that said reference test gear rotates a number of times corresponding to said number of teeth of said master gear without disengaging said master gear from said reference test gear;
   (c) during said rotation of said master gear, measuring displacements of said master gear with reference to said reference test gear, said displacement measurements taken with reference to a predetermined tooth of said test gear and said displacement measurements taken only once per said rotation of said reference test gear;
   (d) recording said displacement measurements;
   (e) determining a compensation value for each tooth of said master gear based on said recorded displacements;
   (f) replacing said reference test gear with another test gear and measuring displacements of said master gear with reference to said another test gear, said another test gear having unknown run-out; wherein said another test gear rotates once and said measurement with reference to said another test gear is taken with reference to every tooth of said another test gear during said rotation of said another test gear; and
   (g) determining a compensated displacement value for each tooth of said another test gear by subtracting said determined compensation value corresponding to each tooth of said master gear from said measured displacements of said master gear with reference to said another test gear, thereby to calculate a run-out value for said another test gear based on said compensated displacement values.

2. The method of claim 1, said determining step (e) further comprising the steps of:
   (e1) matching said recorded displacements of said master gear with corresponding teeth of said master gear;
   (e2) averaging said recorded displacements of said master gear;
   (e3) subtracting said average from each of said recorded displacements, giving positive and negative deviation for each of said teeth of said master gear; and
   (e4) storing said deviations as said compensation values for each tooth of said master gear.

3. A method for double flank meshing testing, said method comprising the steps of:
   (a) meshing a reference test gear and a master gear without backlash, wherein a total number of teeth of said reference test gear has no common factors with a total number of teeth of said master gear;
   (b) rotating said reference test gear and said master gear intermeshed without backlash so that said reference test gear rotates a number of times corresponding to said number of teeth of said master gear without disengaging said master gear from said reference test gear;
   (c) during said rotation of said master gear, measuring displacements of said master gear relative to said reference test gear, said measured displacements taken only when a predetermined tooth of said reference test gear engages each tooth of said master gear;
   (d) determining a compensation value of each tooth of said master gear based on said measured displacements, said compensation value being free from deviations based upon said reference test gear;
   (e) replacing said reference test gear with another test gear and meshing said another test gear and said master gear having said compensation value without backlash;
   (f) rotating said another test gear and said master gear intermeshed without backlash so that said another test gear rotates once;

(g) during said rotation of said another test gear, measuring displacements of said master gear relative to said another test gear with reference to every tooth of said another test gear; and (h) compensating said measured displacements of said master gear relative to said another test gear in accordance with said compensation values for each tooth of said master gear.

4. A double flank meshing testing apparatus, comprising:

a reference shaft, mounted to a base, said shaft capable of rotatably supporting a test gear;

a movable spindle, movable with reference to said reference shaft, said movable spindle biased towards said reference shaft;

a motor, for rotating said spindle;

a displacement detector, for detecting displacements of a master gear provided to said spindle from said test gear provided to said shaft;

a tooth detector, for detecting passing gear teeth of said master gear and rotating with said spindle; and a control means, including a memory having a CPU, said control means capable of monitoring said tooth detector and said displacement detector, wherein said master gear and said test gear are provided to said spindle and said shaft, respectively, and said master gear and said test gear are engaged without backlash, and wherein a total number of teeth of said master gear and a total number of teeth of said test gear share no common factors, said apparatus further comprising means for rotating said spindle such that said test gear rotates a number of times corresponding to said number of teeth of said master gear, and means for measuring displacements, during said rotation of said master gear, of said spindle and said master gear, with reference to only a predetermined tooth of said test gear and corresponding to each tooth of said master gear, and means for recording said displacements in said memory, and means for averaging said recorded displacements and for subtracting said average from said recorded displacements to determine a compensation value for said each tooth of said master gear, and means for recording said compensation values.

5. The apparatus according to claim 4, wherein said CPU includes means for using said compensated measured displacements to determine an over ball diameter value for another test gear subsequently placed intermeshed with said master gear.

6. The apparatus according to claim 4, wherein said CPU includes means for using said compensated measured displacements to determine a largest surface defect measurement value for another test gear subsequently placed intermeshed with said master gear.

* * * * *